US008649557B2

(12) United States Patent
Hyung et al.

(10) Patent No.: US 8,649,557 B2
(45) Date of Patent: Feb. 11, 2014

(54) METHOD OF MOBILE PLATFORM DETECTING AND TRACKING DYNAMIC OBJECTS AND COMPUTER-READABLE MEDIUM THEREOF

(75) Inventors: Seung Yong Hyung, Yongin-si (KR); Sung Hwan Ahn, Anyang-Si (KR); Kyung Shik Roh, Seongnam-si (KR); Suk June Yoon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 309 days.

(21) Appl. No.: 12/857,076

(22) Filed: Aug. 16, 2010

(65) Prior Publication Data
US 2011/0052043 A1    Mar. 3, 2011

(30) Foreign Application Priority Data

Aug. 25, 2009    (KR) .................. 10-2009-0078456

(51) Int. Cl.
*G06K 9/00*    (2006.01)
(52) U.S. Cl.
USPC .............................. 382/103; 382/153; 382/154
(58) Field of Classification Search
USPC .......... 382/103, 153, 154, 285; 345/419–427; 356/12–14; 348/42–60
See application file for complete search history.

(56) References Cited

U.S. PATENT DOCUMENTS

| 5,977,978 | A * | 11/1999 | Carey et al. ............. 345/419 |
| 6,658,136 | B1 * | 12/2003 | Brumitt ................. 382/103 |
| 6,714,663 | B1 * | 3/2004 | Bornowski .............. 382/106 |
| 6,775,396 | B2 * | 8/2004 | Matsunaga ............... 382/106 |
| 6,826,293 | B2 * | 11/2004 | Matsunaga ............... 382/106 |
| 6,963,661 | B1 * | 11/2005 | Hattori et al. ............ 382/154 |
| 7,386,226 | B2 * | 6/2008 | Miyoshi et al. ........... 396/89 |
| 7,437,066 | B2 * | 10/2008 | Miyoshi et al. ........... 396/324 |
| 7,728,833 | B2 * | 6/2010 | Verma et al. ............. 345/420 |
| 7,741,961 | B1 * | 6/2010 | Rafii et al. .............. 340/435 |
| 7,769,491 | B2 * | 8/2010 | Fukuchi et al. ........... 700/253 |
| 7,865,267 | B2 * | 1/2011 | Sabe et al. .............. 700/245 |
| 7,995,055 | B1 * | 8/2011 | Ma et al. ............... 345/420 |
| 8,073,196 | B2 * | 12/2011 | Yuan et al. ............. 382/103 |
| 8,134,637 | B2 * | 3/2012 | Rossbach et al. .......... 348/348 |
| 8,154,594 | B2 * | 4/2012 | Seki et al. .............. 348/119 |
| 8,320,613 | B2 * | 11/2012 | Krahnstoever et al. ...... 382/103 |
| 8,401,783 | B2 * | 3/2013 | Hyung et al. ............ 701/301 |
| 8,417,490 | B1 * | 4/2013 | Preston et al. ............ 703/2 |
| 2002/0061130 | A1 * | 5/2002 | Kirk et al. .............. 382/154 |
| 2005/0196034 | A1 * | 9/2005 | Hattori et al. ............ 382/154 |
| 2006/0061566 | A1 * | 3/2006 | Verma et al. ............. 345/419 |
| 2006/0082879 | A1 * | 4/2006 | Miyoshi et al. ........... 359/462 |
| 2007/0183629 | A1 * | 8/2007 | Porikli et al. ............ 382/103 |
| 2008/0062167 | A1 * | 3/2008 | Boggs et al. ............. 345/419 |
| 2008/0231628 | A1 * | 9/2008 | Shearer ................. 345/419 |
| 2008/0273751 | A1 * | 11/2008 | Yuan et al. ............. 382/103 |
| 2009/0052740 | A1 * | 2/2009 | Sonoura ................. 382/103 |
| 2009/0148035 | A1 * | 6/2009 | Ohno et al. ............. 382/153 |
| 2009/0167844 | A1 * | 7/2009 | Seki et al. .............. 348/47 |

(Continued)

*Primary Examiner* — Aaron W Carter
(74) *Attorney, Agent, or Firm* — Staas & Halsey LLP (57) ABSTRACT

Disclosed herein is a computer-readable medium and method of a mobile platform detecting and tracking dynamic objects in an environment having the dynamic objects. The mobile platform acquires a three-dimensional (3D) image using a time-of-flight (TOF) sensor, removes a floor plane from the acquired 3D image using a random sample consensus (RANSAC) algorithm, and individually separates objects from the 3D image. Movement of the respective separated objects is estimated using a joint probability data association filter (JPDAF).

18 Claims, 7 Drawing Sheets

(56) References Cited

U.S. PATENT DOCUMENTS

| | | | |
|---|---|---|---|
| 2009/0208094 A1* | 8/2009 | Hattori et al. | 382/153 |
| 2009/0304230 A1* | 12/2009 | Krahnstoever et al. | 382/103 |
| 2010/0111370 A1* | 5/2010 | Black et al. | 382/111 |
| 2010/0161225 A1* | 6/2010 | Hyung et al. | 701/301 |
| 2010/0315505 A1* | 12/2010 | Michalke et al. | 348/118 |
| 2011/0051999 A1* | 3/2011 | Tu et al. | 382/103 |
| 2011/0052043 A1* | 3/2011 | Hyung et al. | 382/154 |
| 2011/0205340 A1* | 8/2011 | Garcia et al. | 348/46 |
| 2011/0293137 A1* | 12/2011 | Gurman et al. | 382/103 |

* cited by examiner

METHOD OF MOBILE PLATFORM DETECTING AND TRACKING DYNAMIC OBJECTS AND COMPUTER-READABLE MEDIUM THEREOF

CROSS-REFERENCE TO RELATED APPLICATIONS

This application claims the benefit of Korean Patent Application No. 2009-78456, filed on Aug. 25, 2009 in the Korean Intellectual Property Office, the disclosure of which is incorporated herein by reference.

BACKGROUND

1. Field

Example embodiments relate to a computer-readable medium and a method of a mobile platform detecting and tracking dynamic objects which extracts a floor plane to detect objects and estimates movement of the detected objects.

2. Description of the Related Art

With development of intelligent unmanned technology, much research is being conducted into a self-location recognition technology and intelligent route design. For a platform (for example, a home service robot or public service robot) to move in an autonomous manner, the platform may recognize the location of a destination as well as the platform and detect various obstacles between the platform and the destination to design a route along which the platform avoids the obstacles.

Simultaneous localization and mapping (SLAM) is related to recognizing self-location while making a map in real time using an image or distance sensor. SLAM is considered an appropriate counterproposal to indoor localization. In particular, much research is being conducted into SLAM using evidence grids or feature points of an image. However, these conventional SLAM technologies perform an algorithm in a static environment (i.e., an environment having no moving objects except a platform). As a result, the conventional SLAM technologies do not exhibit good performance in a dynamic environment (i.e., an environment having moving objects such as people in addition to a platform).

SUMMARY

Therefore, it is an aspect of the example embodiments to provide a method of improving performance of SLAM even in a dynamic environment having moving objects, thereby improving route design performance of a mobile platform.

It is another aspect of the example embodiments to provide a method of a mobile platform detecting moving objects and estimating movement of the objects using an algorithm.

The foregoing and/or other aspects are achieved by providing a method of a mobile platform detecting and tracking moving objects including acquiring a three-dimensional (3D) image of an environment in which the mobile platform moves, removing a floor plane from the 3D image, and individually separating objects from the 3D image with the floor plane removed.

The 3D image acquired by the mobile platform may include a depth map acquired by a time-of-flight (TOF) sensor.

The removing the floor plane from the 3D image may include using a random sample consensus (RANSAC) algorithm.

The individually separating the objects from the 3D image with the floor plane removed may include using a blob algorithm.

The method may further include estimating movement of the respective separated objects using a joint probability data association filter (JPDAF).

The method may further include registering the separated objects as formal dynamic objects when it is determined that the separated objects are dynamic objects and when a predetermined condition is satisfied.

The predetermined condition may entail a covariance value being less than a predetermined critical value.

The method may further include estimating location or velocity of the registered formal dynamic objects to track the dynamic objects.

The method may further include designing a travel route along which the mobile platform avoids the registered formal dynamic objects using the estimated location or velocity of the registered formal dynamic objects.

According to another aspect of one or more embodiments, there is provided at least one computer readable medium including computer readable instructions that control at least one processor to implement methods of one or more embodiments.

Additional aspects and/or advantages will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. Embodiments are described below to explain the present disclosure by referring to the figures.

Figure 1:
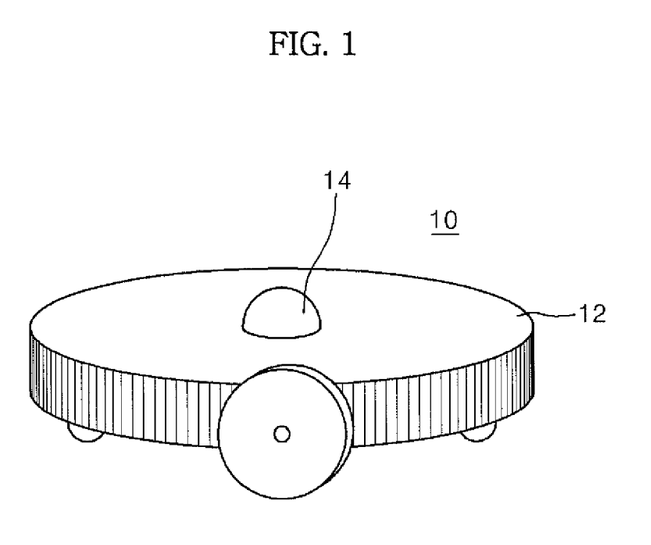
FIG. 1 is an exterior construction view of a mobile platform according to example embodiments.

FIG. 1 is an exterior construction view of a mobile platform according to example embodiments. As an example, a robot that moves in a dynamic environment having a plurality of moving objects in an autonomous manner will be described.

Referring to FIG. 1, the mobile platform 10, including a moving robot body 12 and an image acquisition unit 14 installed on the robot body 12, moves in an unknown dynamic environment in an autonomous manner.

Figure 2:
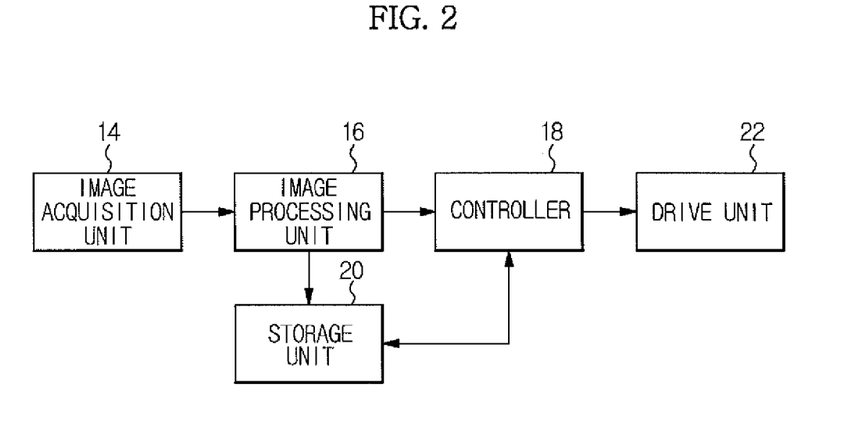
FIG. 2 is a control block diagram of the mobile platform.

FIG. 2 is a control block diagram of the mobile platform. The mobile platform includes an image acquisition unit 14, an image processing unit 16, a controller 18, a storage unit 20, and a drive unit 22.

The image acquisition unit 14 is a three-dimensional (3D) camera sensor that photographs an image on a route along which the mobile platform 10 moves in a dynamic environment having a plurality of moving objects (hereinafter, referred to as dynamic objects) to acquire 3D information of various objects (for example, static objects or dynamic objects) located on the route. The 3D camera sensor may be an infrared (IR) time-of-flight (TOF) sensor used to acquire a depth map. Generally, environment data may not be acquired in real time during movement of the mobile platform. Time to acquire environment data may be reduced to make an environment map in real time and to avoid an obstacle. However, a recently-developed IR TOF sensor may calculate moving time of light from image information acquired through each image by infrared rays to acquire distance information of each pixel. Also, the IR TOF sensor may acquire a depth map in real time without complicated calculations.

The image processing unit 16 receives 3D information (depth map) acquired by the image acquisition unit 14 to extract a feature point of a route along which the mobile platform 10 travels. To extract the feature point, the image processing unit 16 extracts a floor plane from the acquired depth map using a random sample consensus (RANSAC) algorithm, individually separates objects from the depth map using a blob algorithm, and selects an average value of location information of the separated objects as the feature point.

The controller 18 is a central processing unit (CPU) that applies the feature point extracted by the image processing unit 16 to a joint probability data association filter (JPDAF) to estimate movement of the respective objects, assigns dynamic objects to identify (ID) when the dynamic objects are detected, registers the detected dynamic objects as formal dynamic objects, and estimates location and velocity of the formal dynamic objects to track the formal dynamic objects.

The storage unit 20 is a memory to store the current location and the final target location of the mobile platform 10. Also, the storage unit 20 stores data of feature points extracted by the image processing unit 16 and the ID, location, and velocity of dynamic objects acquired by the controller 18.

The drive unit 22 drives the mobile platform 10 based on information of the location and velocity of the registered dynamic objects acquired by the controller 18 such that the mobile platform 10 moves on a route in an autonomous manner without a collision with the registered formal dynamic obstacles.

Figure 3:
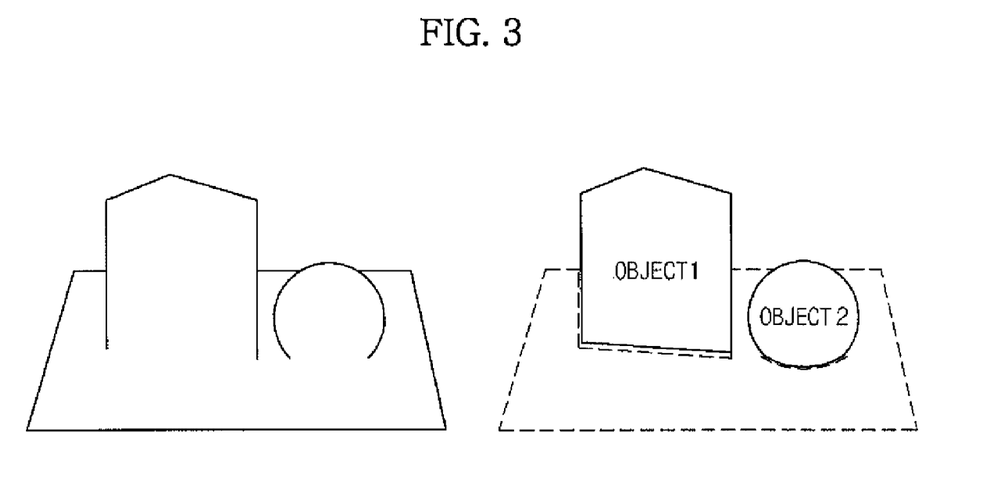
FIG. 3 is a conceptual view of floor plane removal using a random sample consensus (RANSAC) algorithm according to example embodiments.

FIG. 3 is a conceptual view of floor plane removal using the RANSAC algorithm.

Before the mobile platform 10 extracts feature points of objects and detects and estimates dynamic objects using the JPDAF based on the feature points, the objects are separated from one another and recognized. Hereinafter, a method of the mobile platform 10 individually separating and recognizing objects will be described in detail.

The image acquisition unit 14, installed at the mobile platform 10, may include an IR TOF sensor. The mobile platform 10 acquires a depth map of a 3D image of the circumference of the mobile platform 10 from the IR TOF sensor. The acquired depth map has no mark to designate any border between objects. Consequently, the depth map is formed in the shape of a mesh. Individual separation of objects is basically achieved by division between meshes. That is, it is determined that, in the depth map, a point near to the circumference of the mobile platform 10 is included in a mesh, and a point distant from the circumference of the mobile platform 10 is included in another mesh. During individual separation of the objects, all points of an image may be recognized as a mesh due to a floor. For this reason, a floor plane estimated as a floor is removed before separation of the objects is performed.

The floor plane removal is performed using the RANSAC algorithm. RANSAC is a reflexive method of finding a constant parameter of a mathematical model from data including an outlier. The RANSAC algorithm is a nondeterministic algorithm that probabilistically presents results. The RANSAC algorithm presents accurate results through reflexive repetition. The RANSAC algorithm uses a method of removing data considered as an outlier by stages based on the assumption that all points basically exist on a plane. At this time, the outlier means data determined to be noise in a reflexive method of extracting a plane. An inlier, which will be described later, means data finally determined to be a plane.

Basically, a plane equation is represented as follows.

$$a(x-x_p)+b(y-y_p)+c(z-z_p)=0$$

A parameter $[a,x_p,b,y_p,c,z_p]$ in which the sum of distance from data to the plane is minimized is acquired using a least square method. Data distant a predetermined distance from the acquired plane is processed as an outlier, and an optimal value is recalculated. The most probabilistically accurate plane equation is acquired by repeating this process.

Figure 4:
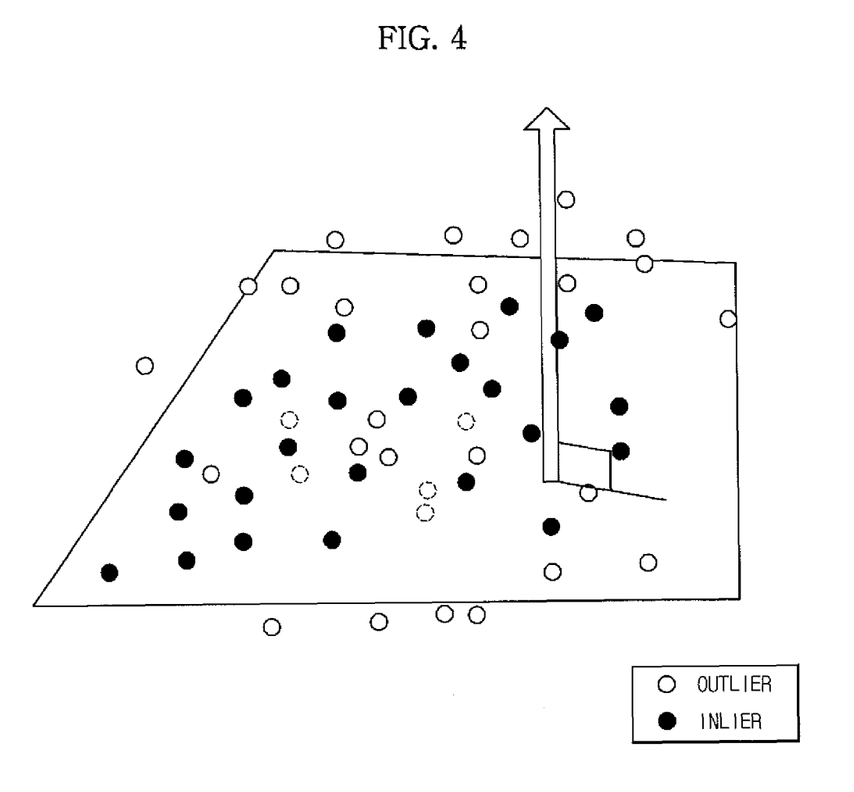
FIG. 4 is a conceptual view of plane extraction using the RANSAC algorithm.

When the plane equation determined to be the most suitable is finally acquired, data corresponding to an inlier may be treated as plane data. When data corresponding to the inlier is removed from the depth map, regions constituted by black dots shown in FIG. 4 are removed, and a mesh of objects is separated from the map. When the mesh of the objects is separated from the map, the objects are separated from one another using a blob algorithm. Each of the separated objects may be called a blob.

Figure 5:
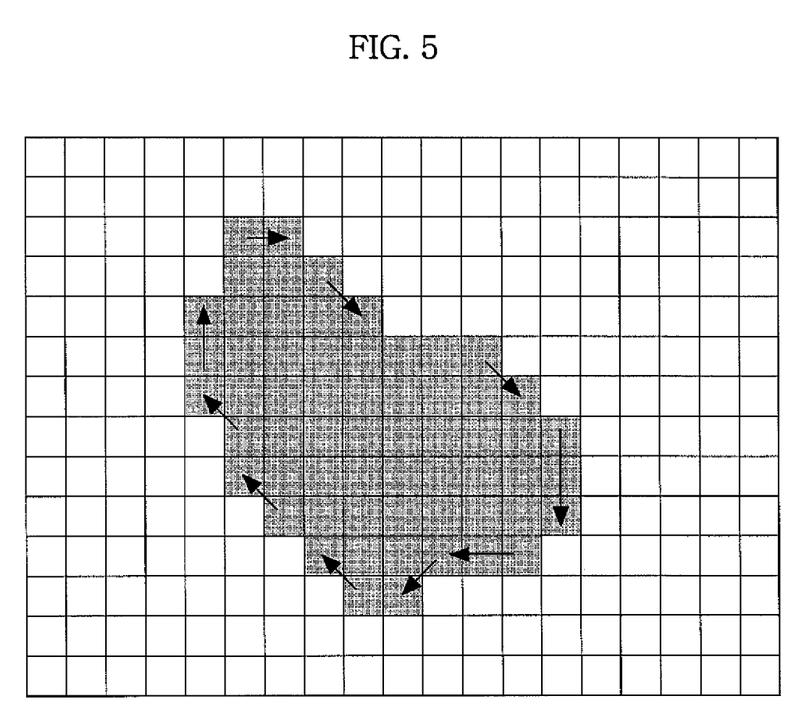
FIG. 5 is a schematic view of a blob algorithm according to example embodiments.

As shown in FIG. 5, the blob algorithm is an algorithm following a border on a binary map. In other words, by assuming that a background is 0 and a mesh of objects is 1, a closed curve is formed along a border of 1 to determine a blob. At this time, when a blob includes several pixels or less, it may not be considered as a blob, but rather is considered as noise and removed. Subsequently, depth values of pixels constituting the blob acquired through the blob algorithm are averaged to extract a representative value of (x, y, z), which is set to a center point of the blob. The center point of the blob is used as data to be applied to the JPDAF, which will be described later.

Figure 6:
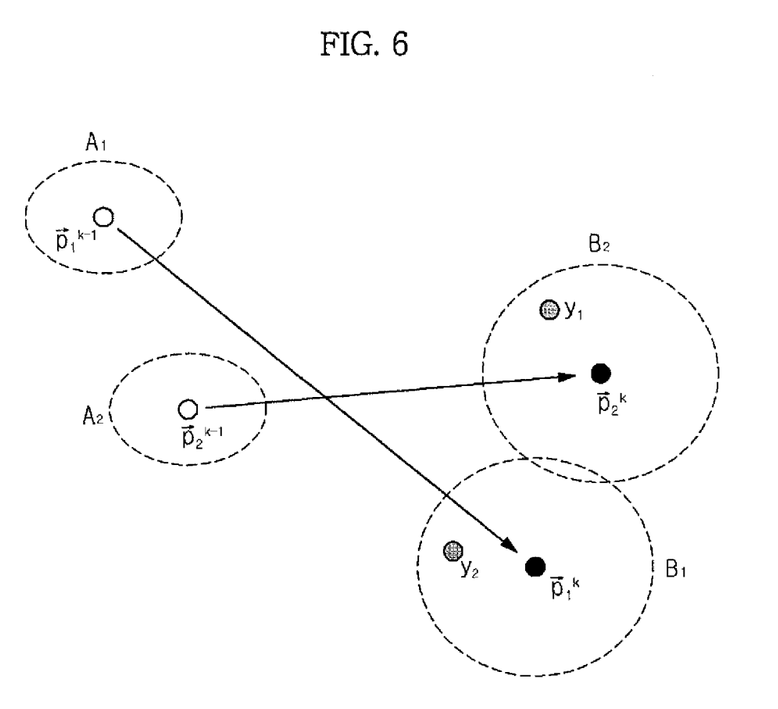
FIG. 6 is a view illustrating the operation of a joint probability data association filter (JPDAF) according to example embodiments.

FIG. 6 is a view illustrating the operation of the JPDAF.

When the objects are individually separated from the depth map, and representative values of the respective objects are extracted, movement of the respective objects is estimated using the JPDAF based on the values.

The JPDAF is a data association method entailing using several estimated values to estimate a state of objects tracked through a method of tracking a plurality of moving objects corresponding to several sensor values upon which the estimation is based such that the estimated values and the sensor values have the highest probability. When using an approximate mathematical model, the JPDAF accurately calculates estimated values of accelerated objects as well as objects in uniform motion. Also, the JPDAF is strong in a cluster environment. Therefore, dynamic objects may even be tracked in a depth map having a large amount of noise due to poor performance of a sensor.

The JPDAF basically uses a Kalman filter algorithm. Each dot has a mathematical model. During estimation, it is estimated where the dots are located at the next time through integral update. During estimation, an error covariance value of the estimated location value is also calculated depending upon accuracy of the model. That is, the estimation error covariance is small for an accurate model, whereas the estimation error covariance is large for an inaccurate model. The JPDAF, used in the method of the mobile platform 10 detecting and tracking the dynamic objects according to example embodiments, sets state variables with respect to respective particles as follows, and a model used for Kalman filter estimation is represented as follows.

$$\overline{x_k} = (P_x V_x P_y V_y P_z V_z)$$

$$F = \begin{bmatrix} 1 & dt & 0 & 0 & 0 & 0 \\ 0 & 1 & 0 & 0 & 0 & 0 \\ 0 & 0 & 1 & dt & 0 & 0 \\ 0 & 0 & 0 & 1 & 0 & 0 \\ 0 & 0 & 0 & 0 & 1 & dt \\ 0 & 0 & 0 & 0 & 0 & 1 \end{bmatrix} \quad G = \begin{bmatrix} 0 & 0 & 0 \\ 1 & 0 & 0 \\ 0 & 0 & 0 \\ 0 & 1 & 0 \\ 0 & 0 & 0 \\ 0 & 0 & 1 \end{bmatrix} \quad H = \begin{bmatrix} 1 & 0 & 0 & 0 & 0 & 0 \\ 0 & 0 & 1 & 0 & 0 & 0 \\ 0 & 0 & 0 & 0 & 1 & 0 \end{bmatrix}$$

$$\overline{x_{k+1}} = F\overline{x_k} + G\overline{w_k}$$
$$\overline{u_k} = H\overline{x_k}$$

Where, $\vec{x}_k$ is an estimated value indicating movement of an object, state variables $P_x$ $V_x$ $P_y$ $V_y$ $P_z$ $V_z$ are x-coordinate, x-direction velocity, y-coordinate, y-direction velocity, z-coordinate, and z-direction velocity. $\vec{x}_{k+1}$ is an estimated value indicating movement of an object at the next time. $w_k$ is a motion model error. $\vec{y}_k$ is a measured value input to sensor data.

In the above model, representative values of blobs extracted by the blob algorithm are used as sensor data. That is, center values of the respective blobs are set as representative values, which are transmitted to sensor data of the JPDAF. Data generated by the blob algorithm may not coincide with the number of continuously tracked dynamic objects. Therefore, the dynamic objects correspond to the blobs in the most probabilistically suitable manner through the JPDAF. In the Kalman filter, sensor measurement values corresponding to the respective estimated values are updated to reduce an estimation error; however, which estimated values the respective measured values correspond to is not clear. When using the JPDAF, however, dots having the most probabilistic approximation correspond to one another during an update in order to find correspondence and acquire the most accurate estimated value, by which the measured values may be updated.

In FIG. 6, $\vec{p}_1^{k-1}$, $\vec{p}_2^{k-1}$ are estimated location values when t is k−1, $\vec{p}_1^{k}$, $\vec{p}_2^{k}$ are estimated location values when t is k, and y1, y2 are measured location values when t is k. When the measured values correspond to the estimated values simply based on the most approximate dots, $\vec{p}_1^{k-1}$, corresponds to y1, and $\vec{p}_2^{k-1}$ corresponds to y2. In the JPDAF, on the other hand, $\vec{p}_1^{k-1}$ may correspond to y2, and $\vec{p}_2^{k-1}$ may correspond to y1, by using the previously defined dynamic model. The latter may be a more probabilistically accurate correspondence method. Estimated values on location, angular velocity, and radius of gyration of the respective feature points may be acquired while the feature points are tracked through such filtering.

In this way, the JPDAF detects states of the respective separated objects. That is, when an object is still and is thus determined to be a static object, a representative value of the static object is stored in the storage unit 20 as data to localize the mobile platform 10. On the other hand, when an object is moving and is thus determined to be a dynamic object, movement of the dynamic object is tracked, and, when a predetermined condition is satisfied, the dynamic object is registered as a formal dynamic object. Registration of the formal dynamic object is performed using a covariance value during tracking. In the continuous tracking, the covariance value decreases. If tracking fails, the covariance value increases. When the covariance value is less than a predetermined critical value, it is determined that the tracking of the dynamic object is successful, and the tracked dynamic object is assigned an ID and registered as a formal dynamic object.

In the method of the mobile platform detecting and tracking the dynamic objects according to example embodiments, location or velocity of the registered formal dynamic object is estimated using the JPDAF to track the registered formal dynamic objects. Also, a velocity component may estimate a movement trend of the dynamic object to design a travel route along which the registered dynamic object may be avoided.

Figure 7:
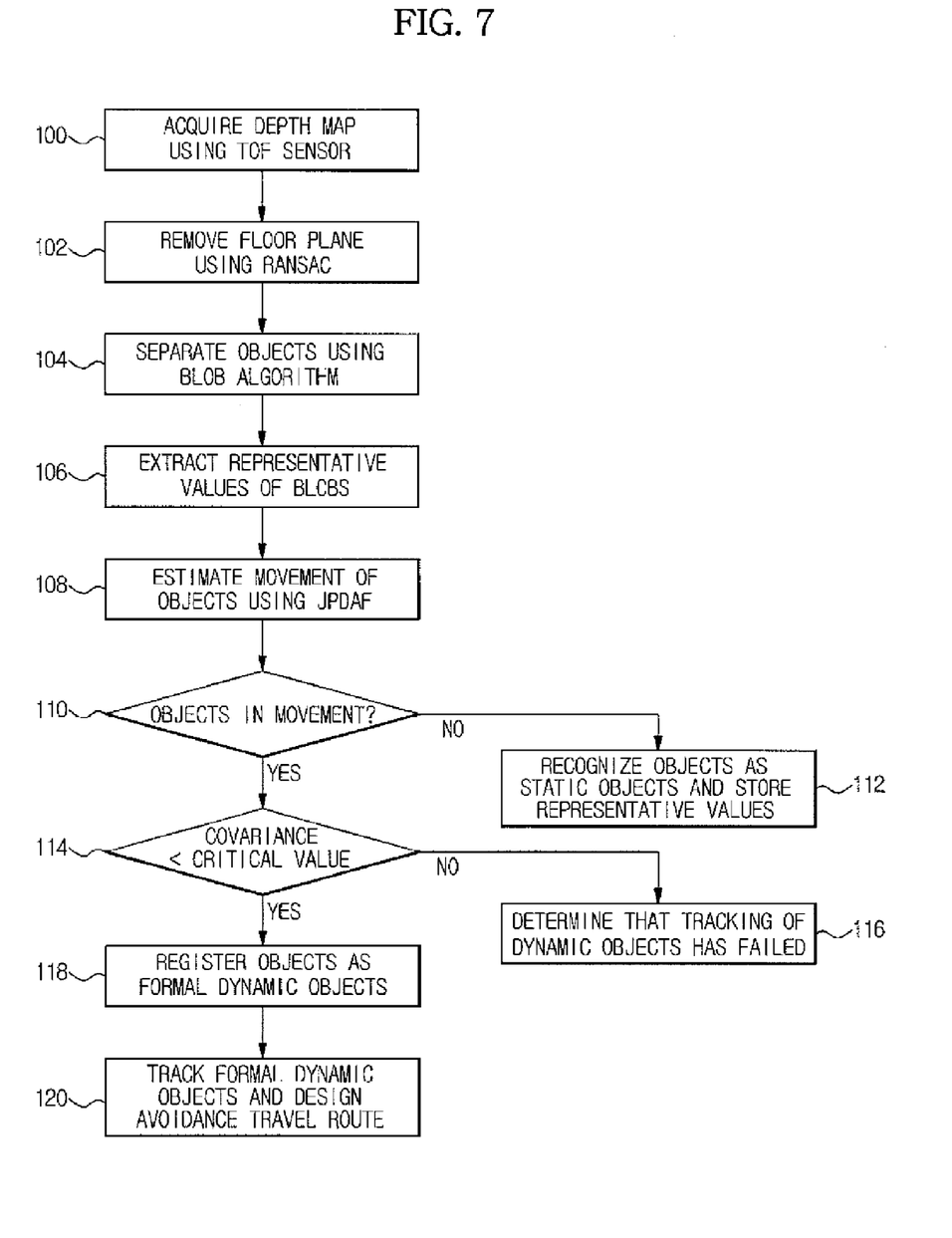
FIG. 7 is a flow chart illustrating an algorithm of a mobile platform detecting and tracking dynamic objects according to example embodiments.

FIG. 7 is a flow chart illustrating an algorithm of a mobile platform detecting and tracking dynamic objects according to example embodiments. Hereinafter, the operation of the mobile platform 10 to detect and track the dynamic objects will be described in detail with reference to the flow chart.

When the mobile platform 10 moves, the image acquisition unit (IR TOF sensor) 14 photographs a 3D image of the circumference of the mobile platform 10 to acquire a depth map including static and dynamic objects (100).

Subsequently, a floor plane is removed from the acquired depth map using a RANSAC algorithm (102), the objects are individually separated from the depth map using a blob algorithm (104), and center coordinate values of the respective separated objects are extracted as representative values (106). The representative values are used as sensor data when movement of the objects is estimated using a JPDAF.

Detecting and tracking dynamic objects using the JPDAF are performed as follows. First, the representative values of the previously separated objects are input as sensor data to estimate movement of the objects using the JPDAF (108). At this time, the JPDAF receives the sensor data as measured values to perform data association and repeats measurement update to estimate estimated values.

During repetition of the above operation, the JPDAF determines movement of the objects using relative velocity between the mobile platform 10 and the objects. It is determined whether the objects are in movement (110). When it is determined that the objects are not in movement, the objects are recognized as static objects, and representative values of the static objects are stored in the storage unit 20 (112).

When it is determined that the objects are in movement, the objects are recognized as dynamic objects, and it is determined whether a covariance value is less than a predetermined critical value (114). When the covariance value is greater than the critical value, it is determined that tracking of the dynamic objects has failed (116). When the covariance value is less than the critical value, it is determined that tracking of the dynamic objects is successful, and the dynamic objects are registered as formal dynamic objects (118). Upon registration as the formal dynamic objects, the formal dynamic objects are tracked using information, such as location and velocity of the estimated formal dynamic objects, and the mobile platform 10 designs a travel route along which the mobile platform 10 avoids the formal dynamic objects based on the tracked information (120).

As is apparent from the above description, the mobile platform removes a floor plane from 3D image information using a RANSAC algorithm and detects and tracks dynamic objects using a JPDAF, thereby more reliably performing simultaneous localization and mapping (SLAM) in an environment having a plurality of dynamic objects. Also, the mobile platform designs a travel route along which the mobile platform avoids dynamic objects without a collision using estimated travel routes of the dynamic objects in addition to tracking the dynamic objects.

The above-described embodiments may be recorded in computer-readable media including program instructions to implement various operations embodied by a computer. The media may also include, alone or in combination with the program instructions, data files, data structures, and the like. Examples of computer-readable media (computer-readable storage devices) include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although embodiments have been shown and described, it would be appreciated by those skilled in the art that changes may be made in these embodiments without departing from the principles and spirit of the disclosure, the scope of which is defined in the claims and their equivalents.

What is claimed is:

1. A method of a mobile platform detecting and tracking moving objects, comprising:
acquiring a three-dimensional (3D) image of an environment in which the mobile platform moves;
extracting and removing, using a processor, a floor plane from the 3D image;
individually separating, using the processor, objects from the 3D image with the floor plane removed;
estimating movement of the respective separated objects; and
registering the respective separated objects as formal dynamic objects when a predetermined condition is satisfied,
wherein the predetermined condition entails a covariance value being less than a predetermined critical value.

2. The method according to claim 1, wherein the extracting and removing the floor plane from the 3D image comprises using a random sample consensus (RANSAC) algorithm.

3. The method according to claim 1, wherein the 3D image acquired by the mobile platform comprises a depth map acquired by a time-of-flight (TOF) sensor.

4. The method according to claim 3, wherein the extracting and removing the floor plane from the 3D image comprises performing a RANSAC algorithm using pixel information of the depth map acquired by the TOF sensor as data.

5. The method according to claim 3, wherein the individually separating the objects from the 3D image with the floor plane removed comprises using a blob algorithm.

6. The method according to claim 3, wherein the movement of the respective separated objects is estimated using a joint probability data association filter (JPDAF).

7. The method according to claim 6, further comprising registering the respective separated objects as formal dynamic objects when it is determined that the respective separated objects are dynamic objects as a result of estimating the movement of the respective separated objects using the JPDAF and when the predetermined condition is satisfied.

8. The method according to claim 7, further comprising estimating location or velocity of the registered formal dynamic objects to track the dynamic objects.

9. The method according to claim 8, further comprising designing a travel route along which the mobile platform avoids the registered formal dynamic objects using the estimated location or velocity of the registered formal dynamic objects.

10. At least one non-transitory computer readable medium comprising computer readable instructions that control at least one processor to implement a method, comprising:
acquiring a three-dimensional (3D) image of an environment in which the mobile platform moves;
extracting and removing a floor plane from the 3D image;
individually separating objects from the 3D image with the floor plane removed;
estimating movement of the respective separated objects; and
registering the respective separated objects as formal dynamic objects when a predetermined condition is satisfied,
wherein the predetermined condition entails a covariance value being less than a predetermined critical value.

11. The at least one non-transitory computer readable medium comprising computer readable instructions that control at least one processor to implement the method of claim 10, wherein the extracting and removing the floor plane from the 3D image comprises using a random sample consensus (RANSAC) algorithm.

12. The at least one non-transitory computer readable medium comprising computer readable instructions that control at least one processor to implement the method of claim 10, wherein the 3D image acquired by the mobile platform comprises a depth map acquired by a time-of-flight (TOF) sensor.

13. The at least one non-transitory computer readable medium comprising computer readable instructions that control at least one processor to implement the method of claim 12, wherein the extracting and removing the floor plane from the 3D image comprises performing a RANSAC algorithm using pixel information of the depth map acquired by the TOF sensor as data.

14. The at least one non-transitory computer readable medium comprising computer readable instructions that control at least one processor to implement the method of claim 12, wherein the individually separating the objects from the 3D image with the floor plane removed comprises using a blob algorithm.

15. The at least one non-transitory computer readable medium comprising computer readable instructions that control at least one processor to implement the method of claim 12, wherein the movement of the respective separated objects is estimated using a joint probability data association filter (JPDAF).

16. The at least one non-transitory computer readable medium comprising computer readable instructions that control at least one processor to implement the method of claim 15, further comprising registering the respective separated objects as formal dynamic objects when it is determined that the respective separated objects are dynamic objects as a result of estimating the movement of the respective separated objects using the JPDAF and when the predetermined condition is satisfied.

17. The at least one non-transitory computer readable medium comprising computer readable instructions that control at least one processor to implement the method of claim 16, further comprising estimating location or velocity of the registered formal dynamic objects to track the dynamic objects.

18. The at least one non-transitory computer readable medium comprising computer readable instructions that control at least one processor to implement the method of claim 17, further comprising designing a travel route along which the mobile platform avoids the registered formal dynamic objects using the estimated location or velocity of the registered formal dynamic objects.

* * * * *